United States Patent [19]
Lee

[11] Patent Number: 5,978,920
[45] Date of Patent: Nov. 2, 1999

[54] COMPUTER SYSTEM HAVING A FUNCTION FOR INTERCEPTING LEWD/VIOLENT PROGRAMS AND METHOD FOR CONTROLLING ACCESS OF SUCH LEWD/VIOLENT PROGRAMS

[75] Inventor: Sang-Jin Lee, Suwon, Rep. of Korea

[73] Assignee: SamSung Electronics Co., Ltd., Kyungki-do, Rep. of Korea

[21] Appl. No.: 08/923,099

[22] Filed: Sep. 4, 1997

[30]   Foreign Application Priority Data

Sep. 4, 1996 [KR] Rep. of Korea ................... 96/38280

[51] Int. Cl.$^6$ .................................................. G06F 12/14
[52] U.S. Cl. ........................................................... 713/202
[58] Field of Search ...................... 395/188.01, 712; 713/202

[56]   References Cited

U.S. PATENT DOCUMENTS

| | | |
|---|---|---|
| 4,930,160 | 5/1990 | Vogel . |
| 5,006,976 | 4/1991 | Jundt ...................................... 364/184 |
| 5,214,556 | 5/1993 | Kilbel . |
| 5,382,983 | 1/1995 | Kwoh et al. . |
| 5,387,942 | 2/1995 | Lemelson . |
| 5,485,518 | 1/1996 | Hunter et al. . |
| 5,548,345 | 8/1996 | Brian et al. . |
| 5,550,575 | 8/1996 | West et al. . |
| 5,583,576 | 12/1996 | Perlman et al. . |
| 5,596,639 | 1/1997 | Kikinis ........................................ 380/4 |
| 5,652,793 | 7/1997 | Priem et al. ................................ 380/4 |
| 5,768,503 | 6/1998 | Olkin ............................. 395/188.01 X |
| 5,828,834 | 10/1998 | Choi ................................... 395/188.01 |
| 5,870,467 | 2/1999 | Imai et al. ...................... 395/188.01 X |

*Primary Examiner*—Thomas M. Heckler
*Attorney, Agent, or Firm*—Robert E. Bushnell, Esq.

[57]   ABSTRACT

A computer system having a function of interrupting lewd/violent programs which includes a read-only-memory for storing an initialization program and a security grade setup program; a non-volatile memory device for storing a security grade which is a program classification code selected by a user for designating an unacceptable program content contained in an application program, and a password for identifying the user when changing the security grade; and a controller for controlling execution of an application program according to the security grade of the application program and the security grade stored in the non-volatile memory device during initialization, and for controlling the changing of the security grade stored in the non-volatile memory device during the security grade setup, when the user inputs a password that corresponds to the password stored in the non-volatile memory device. As a result, the computer system is able to limit access to application programs that contain unacceptable levels of graphic sex, violence, and strong language.

13 Claims, 5 Drawing Sheets

COMPUTER SYSTEM HAVING A FUNCTION FOR INTERCEPTING LEWD/VIOLENT PROGRAMS AND METHOD FOR CONTROLLING ACCESS OF SUCH LEWD/VIOLENT PROGRAMS

CLAIM FOR PRIORITY

This application makes reference to, incorporates the same herein, and claims all benefits accruing under 35 U.S.C. §119 from an application for A COMPUTER HAVING A FUNCTION FOR INTERCEPTING LEWD/VIOLENT PROGRAMS AND THE CONTROLLING METHOD THEREOF earlier filed in the Korean Industrial Property Office on the Sep. 4th 1996, and there duly assigned Ser. No. 38280/1996, a copy of which application is annexed hereto.

BACKGROUND OF THE INVENTION

1. Technical Field

The present invention relates to a computer system having a function for intercepting lewd/violent programs, and more particularly, relates to a computer system capable of executing application programs according to a set security grade and an application program grade and a method for controlling access of such application programs.

2. Related Art

Computer programs available for home multi-media computer systems today, like their predecessor video programs for viewing on television receivers, video cassette recorders, and cable boxes, vary greatly in their content of such things as violence, nudity, depictions of sexual acts, strong language, or other things many people may regard as obscene or otherwise objectionable. Many pornographic or extremely violent computer game programs intended for adults have become readily accessible to unintended audiences such as teenagers and children, and increasingly unmanageable by distributors and parents.

Unlike television receivers, video cassette recorders, and cable boxes in which parental control systems and censorship supervision systems are available for parents to control the video viewing of undesirable programs however, home computer systems have not provided parents with a comprehensive control over pornographic or extremely violent computer programs which may be accessed by teenagers and children left unattended at home. For example, contemporary parental control techniques for television receivers and cable boxes are disclosed in U.S. Pat. No. 4,930,160 for Automatic Censorship Of Video Programs issued to Vogel, U.S. Pat. No. 5,382,983 for Apparatus And Method For Total Parental Control Of Television Use issued to Kwoh et al., U.S. Pat. No. 5,387,942 for System For Controlling Reception Of Video Signals issued to Lemelson, U.S. Pat. No. 5,485,518 for Electronic Media Program Recognition And Choice issued to Hunter et al., U.S. Pat. No. 5,550,575 for Viewer Discretion Television Program Control System issued to West et al., U.S. Pat. No. 5,583,576 for Rating-Dependent Parental Lock-Out For Television Reception issued to Perlman et al. Video viewing censoring systems for video cassette recorders may be disclosed, for example, in U.S. Pat. No. 5,214,556 for Video Cassette Recorder Protection System issued to Kilbel, and U.S. Pat. No. 5,548,345 for Video Viewing Censoring Supervision System issued to Brian et al. In general, there are essentially two techniques to parental control of viewing of undesirable video programs on televisions or video cassette recorders. The first technique requires participation of individuals at home to invariably control admission of video programs that fail to satisfy their own content criteria. The second technique requires participation of broadcasters in what is generally termed a "V-chip" approach. A program classification code which represents an arbitrary number of designations for rating the program content according to levels of violence, graphic sex, obscenity or other undesirable content is encoded into a video signal for transmission purposes. Before reaching the picture generation elements of the television receiver, the video signal is received by control circuitry which extracts the program classification code therefrom for comparison with a preselected reception code which represents the program content which is desired to either block or allow the reception of the video signal by the television receiver.

Despite of a litany of parental control and censorship supervision systems that are available for television receivers, video cassette recorders and cable boxes, I have observed however, that none is provided for home computer systems. Consequently, there is no effective means currently available for home computer systems to limit access to pornographic programs or extremely violent computer games.

SUMMARY OF THE INVENTION

Accordingly, it is therefore an object of the present invention to provide a computer system capable of limiting access to undesirable computer programs such as pornographic programs or extremely violent computer games.

It is also an object to provide a computer system and process of interrupting execution of a computer program according to a set security grade by a user when the computer program contains a security grade which is a program classification code provided by software suppliers for designating an acceptable or unacceptable level of graphic sex, violence, and strong language that exceeds the security grade set by the user.

These and other objects of the present invention can be achieved by a computer system having a function for intercepting lewd/violent programs which includes a central processing unit (CPU) for controlling execution of an application program containing a predetermined security grade provided by software suppliers; a controller for controlling the direct memory access, and the setting of interruption of the application program; a random-access-memory (RAM) for loading and executing the system and the application program; a read-only-memory (ROM) for storing an initialization program executed when power is turned on, a basic input/output system (BIOS) program for interfacing a hardware and a software, and a security grade setup program; and a security grade memory for storing security grade infonmation to pennit execution of the application program and a secret number for identifying the user when changing the security grade information. The central processing unit (CPU) controls the execution of an application program according to the security grade of the application program and the security grade stored in security grade memory, and controls the setting of new security grade and update of security grade memory which limits access of the application program with a different level of graphic sex, violence, and strong language when an input secret number corresponds to a set number of the security grade setup program stored in ROM.

The security grade examination process as contemplated by the present invention includes the steps of comparing the security grade contained in an application program with the security grade set to the computer system, determining whether the security grade set to the computer system enables execution of the present application program, executing the application program when the security grade set to the computer enables execution of the present application program, and outputting the error message when the security grade set to the computer system does not enable execution of the present application program.

The security grade setup process as contemplated by the present invention includes the steps of receiving a secret number when a specific key is input during initialization of the computer system, determining whether the input secret number corresponds to the set secret number, updating a new security grade received by a key input of the user when the two secret numbers coincide with each other, and outputting an error message when the two secret numbers do not coincide with each other.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
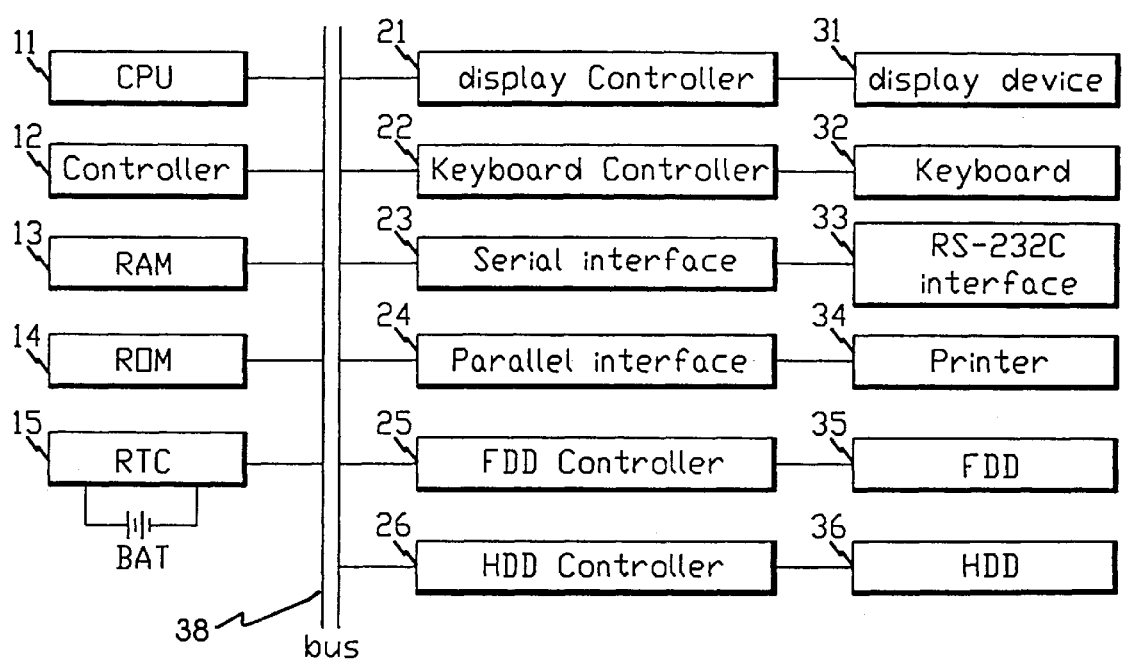
FIG. 1 is an internal schematic diagram of a typical computer system.

Referring now to the drawings and particularly to FIG. 1, which illustrates a typical computer system such as a personal computer PC. As shown in FIG. 1, the personal computer includes a central processing unit (CPU) 11, a controller 12, a random-access-memory (RAM) 13, a read-only-memory (ROM) 14, a real time clock (RTC) 15, peripheral device controllers 21–26, peripheral device 31–36, and a system bus 38. In particular, the peripheral device controller includes a display controller 21, a keyboard controller 22, a serial interface 23, a parallel interface 24, a floppy disk drive (FDD) controller 25, and a hard disk drive (HDD) controller 26. Likewise, the peripheral device includes a display device 31, a keyboard 32, RS-232C interface 33, a printer 24, a FDD 35, and a HDD 36.

The CPU 11, the controller 12, the RAM 13, the ROM 14, and the RTC 15 are connected with the peripheral device controller 21–26 through the system bus 38, and each peripheral device controller 21–26 is connected to each corresponding peripheral device 31–36. The CPU 11 executes a system program and an application program, and an operation processing function. The controller 12 executes a direct memory access control, a program enable interrupt control and a bus control function. The RAM 13 loads a program executed by the CPU 11, and the ROM 14 stores a power-on self-test (POST) program and a basic input/output system (BIOS) program interfacing of a hardware and a software. The RTC 15 is a timer module having a distinct battery BAT, and has an independent processor for time calculation. In addition, the RTC 15 includes registers in order to memorize the infonnation of the system configuration, and the registers can be substituted the nonvolatile memory such as an electrically erasable and programmable read-only-memory (EEPROM) and a flash memory.

As I have discussed earlier, typical home computer systems such as those in FIG. 1 do not contain any effective provision to prevent teenagers or children from accessing unacceptable application programs that contain an excessive level of violence, nudity, depictions of sexual acts, strong language or other forms of obscenity.

Figure 2:
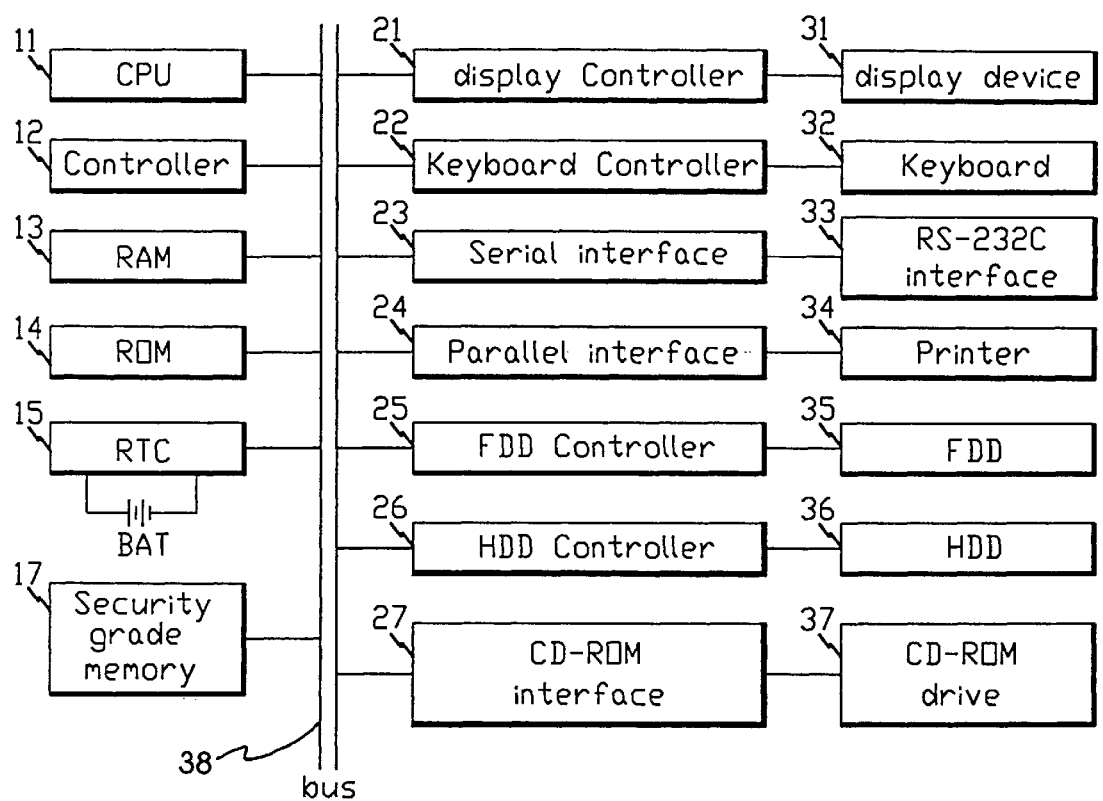
FIG. 2 is an internal schematic diagram of a computer system constructed according to the principles of the present invention.

Turning now to FIG. 2 which illustrates a computer system having a function of intercepting lewd/violent programs constructed according to the principles of the present invention. As shown in FIG. 2, the computer system includes a CPU 11, a controller 12, a RAM 13, a ROM 14, a RTC 15, a security grade memory 17, peripheral device controller 21–27, peripheral device 31–37, and a system bus 38.

The peripheral device controller includes a display controller 21, a keyboard controller 22, a serial interface 23, a parallel interface 24, a FDD controller 25, a HDD controller 26 and a CD-ROM interface 27. The peripheral device includes a display device 31, a keyboard 32, a RS-232C interface 33, a printer 24, a FDD 35, a HDD 36 and a CD-ROM drive 37.

The CPU 11, the controller 12, the RAM 13, the ROM 14, the RTC 15 and the security grade memory 17 are connected with each other through the system bus 38, and are connected to the peripheral device controller 21–27. Each peripheral device controller 21–27 are connected to each peripheral device 31–37. The CPU 11 executes the system program and the application program, or the operation processing function. The controller 12 executes the functions of a direct memory access control, a programmable interrupt control and bus control.

RAM 13 loads the program executed by the CPU 11, and the ROM 14 stores an initialization program executed when power is turned on, a basic input/output system (BIOS) program for interfacing a hardware and a software, and a security grade setup program. The RTC 15 is a timer module having a distinct battery BAT, and has an independent processor for time calculation. In addition, the RTC 15 includes registers in order to memorize the information of the system configuration, and the registers can be substituted the nonvolatile memory such as an electrically erasable and programmable read-only-memory (EEPROM) and a flash memory.

Display controller 21 controls a display operation of the display device 31, and the keyboard controller 22 controls a key input of the keyboard 32. Also, the keyboard controller 22 can include a logic for interfacing the mouse. The serial interface 23 includes an interface logic for a serial communication, and uses an universal asynchronous receiver/transmitter (UART). The RS-232C interface 33 is an interface device for executing the RS-232C communication method, and is connected to a serial printer, an external modem, a remote personal computer, etc.

Parallel interface 24 is an interface logic for a parallel communication, and a printer 34 connected to the parallel interface is a parallel printer. The FDD controller 25 controls the FDD 35 and connects with at least one FDD. The HDD controller 26 controls the HDD 36 and connects with at least one HDD. The CD-ROM interface 27 controls the access about a CD-ROM between the bus 38 and the CD-ROM drive 37. The security grade memory 17 is used to store a security grade which is a program classification code set by a user for designating an unacceptable level of graphic sex, violence, or strong language contained in different application programs. For instance, after the user sets a predetermined security grade in the security grade memory 17, and if an application program usable in the computer system contains a security grade that either corresponds or exceeds the security grade set by the user in the security grade memory 17, the application program will be interrupted and disabled from operation in order to prevent children from viewing any undesirable content, such as pornography and extreme violence contained in the application program. Alternatively, the security grade memory 17 may be used to store a set of security grade information which are program classification codes individually set by a user for designating different levels of graphic sex, violence, or strong language contained in different application programs. Both embodiments however, require entry of a secret number (password or PIN number) for identifying the user when a new security grade needs to be updated. The data stored by the bus control of the controller 12 is read from the security grade memory 17 and is written into the security grade memory 17 when the application program is executed or the security grade setup program stored to the ROM 14 is executed by the CPU 11.

Figure 3:
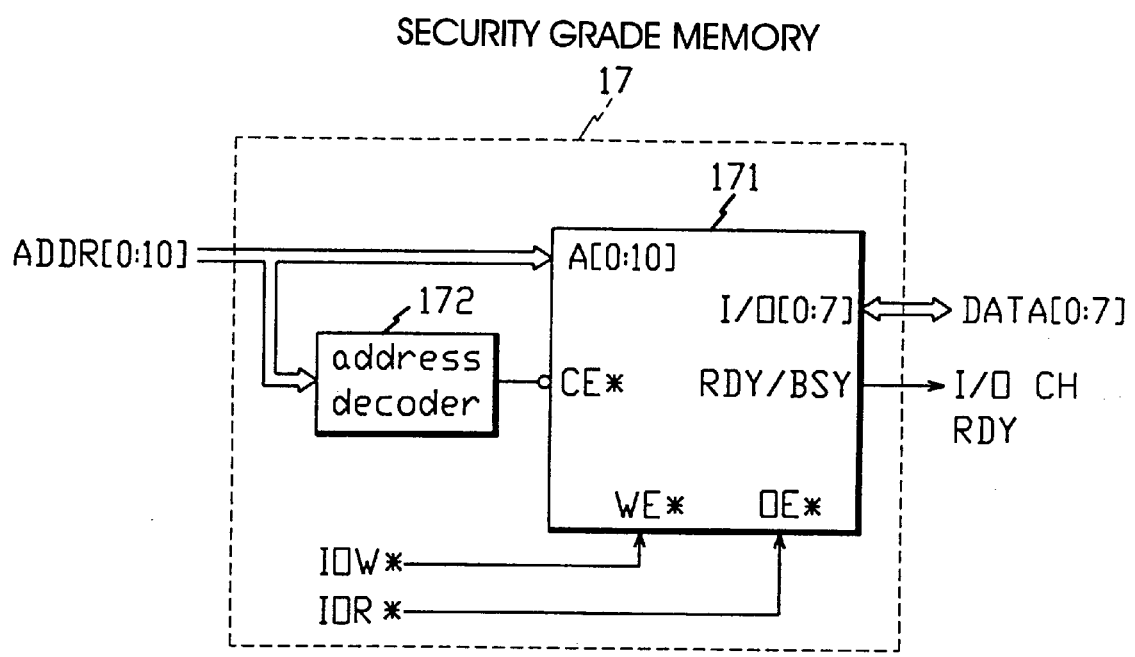
FIG. 3 is a detailed circuit diagram of a security grade memory of the computer system as shown in FIG. 2.

Now, the reading and writing process of the security grade memory 17 will be explained in detail with reference to FIG. 3 hereinbelow. As shown in FIG. 3, the security grade memory 17 includes an EEPROM 171 and an address decoder 172. The address bus (ADDR[0:10]) is extended from the system bus 38 of the computer system as shown in FIG. 2, and the input port A[0:10] of the EEPROM 171 and the input port of the address decoder 172 are connected to the address bus (ADDR[0:10]). The output port of the address decoder 172 is connected to the chip enable port CE* of the EEPROM 171. The data bus (DATA[0:7]) is extended from the system bus 38 of the computer system as shown in FIG. 2, and is connected to the data input/output port (I/O [0:7]) of the EEPROM 171. A ready/busy (ARDY/BSY) port of the EEPROM 171 is connected to an input/output channel ready (I/O CH-RDY) signal line, and a write enable port WE* and a read enable port RE* are respectively connected to an input/output write IOW* signal line and an input/output read IOR* signal line.

First, a process for reading data stored to the EEPROM 171 will now be described. If the address is generated in order to access the security grade memory while the program of the CPU 11 is executed, the address decoder 172 reads the address input through the address bus (ADDR [0:10]). When the address input through the address decoder 172 corresponds to the EEPROM 171, the address decoder 172 generates a predetermined enable signal and transmits the signal to the chip enable port CEk, and the EEPROM 171 receives the address of the address bus (ADDRFO:101). In addition, the EEPROM 171 outputs a predetermined I/O CH RDY signal through the RDY/BSY port, and the controller 12 generates an input/output read IOR* signal for responding the I/O CH-RDY signal. Accordingly, the EEPROM 171 is in an output enable state, and outputs data corresponding to the input address through the input/output port (I/O[0:7]).

Next, a process for writing the data on the EEPROM 171 will now be described. If the address is generated in order to access the security grade memory while the program of the CPU 11 is executed, the address decoder 172 reads the address input through the address bus (ADDR[0:10]). When the address input through the address decoder 172 corresponds to the EEPROM 171, the address decoder 172 generates a predetermined enable signal and transmits the signal to the chip enable port CE*, and the EEPROM 171 receives the address of the address bus (ADDR[0:10]). Also, the EEPROM 171 outputs a predetermined I/O CH-RDY signal through the PDY/BSY port, and the controller 12 generates an input/output write IOW* signal for responding the I/O CH-RDY signal. Accordingly, the EEPROM 171 is in a write enable state, and the data of the data bus (DATA [0:7]) corresponding to the input address is stored through the input/output port (I/O[0:7]).

Security grade memory embodied by an EEPROM is used in the present invention in order to store the security grade, but the technical range of this invention is not limited to this. The security grade information should be maintained even when the power is turned off. As a result, the security grade memory should be a non-volatile memory, and preferably, a flash memory which is part of the ROM 14 and CMOS RAM of the RTC of the computer system as shown in FIG. 2 can be used for storing the security grade. This is because the flash memory in the ROM 14 and the CMOS RAM in the RTC can retain data even when the power is turned off.

Figure 4:
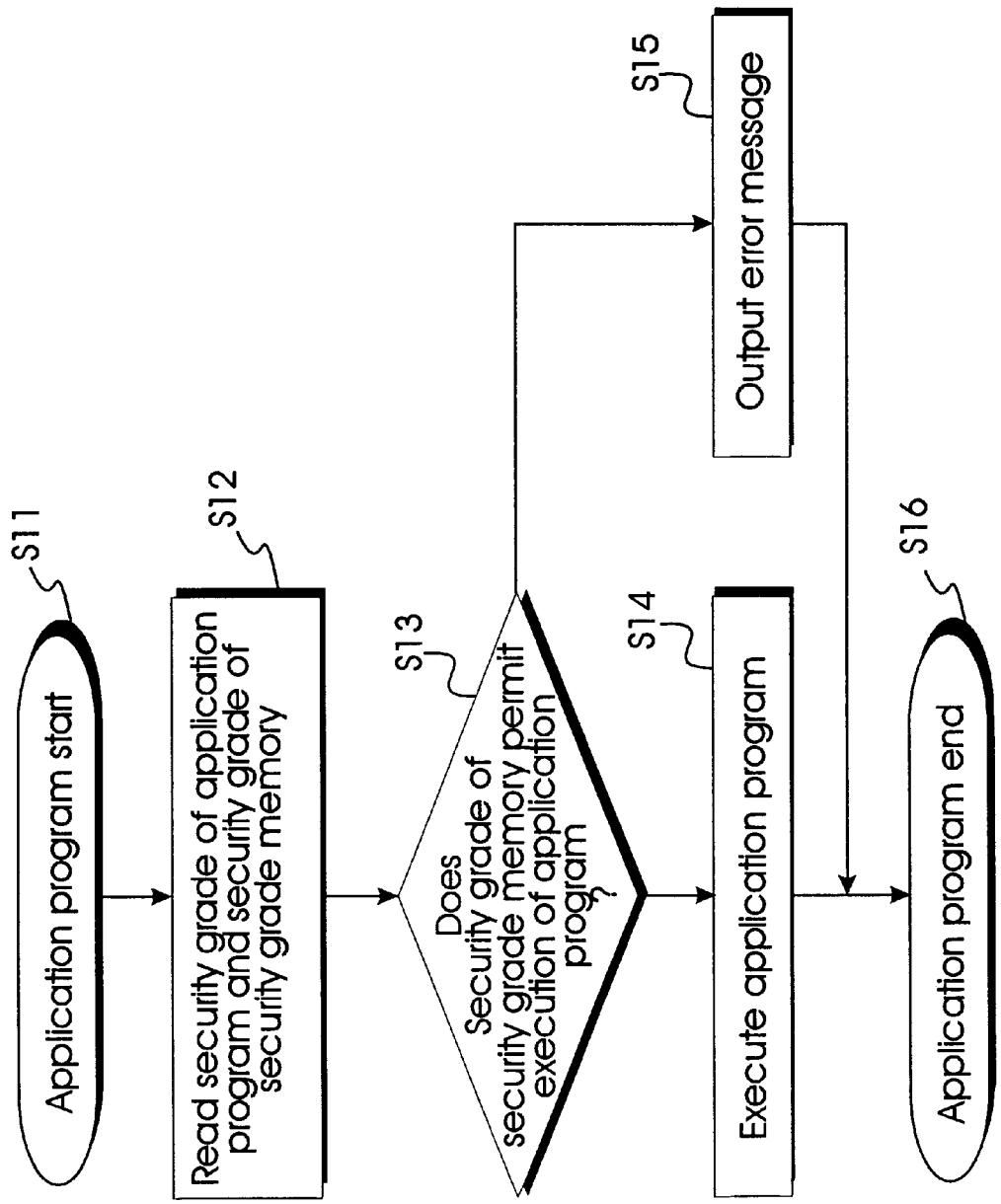
FIG. 4 is a flow chart illustrating a process of intercepting a lewd/violent program in the computer system according to the principles of the present invention.
Figure 5:
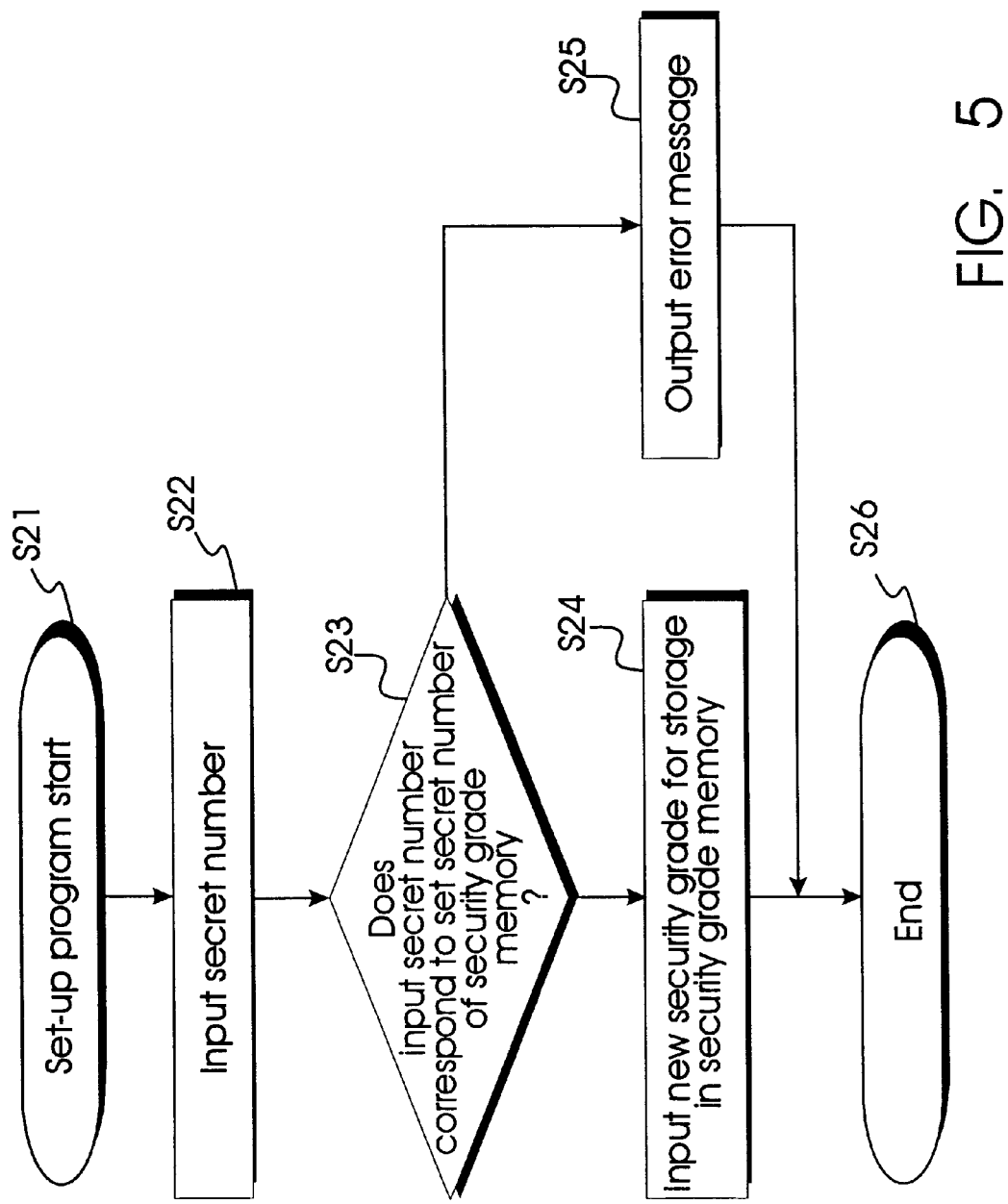
FIG. 5 is a flow chart illustrating a process of inputting the security grade to the computer system according to the principles of the present invention.

A process of controlling interruption of an application program containing a security grade according to a set security grade stored in security grade memory 17 will now be described with reference to FIG. 4 hereinbelow.

First, the CPU 11 initializes an application program when the application program is first inserted into the computer system by way of CD-ROM drive 37 or other available means at step S11. After that, the CPU 11 reads the security grade contained in the application program and the security grade stored in the security grade memory 17 in the manner as described with reference to FIG. 3, and compares the two security grades at S12.

Next, the CPU 11 determines whether the security grade stored in the security grade memory 17 can enable execution of the application program at S13, that is, whether the security grade of the application program does not exceed the security grade of the security grade memory 17. If the security grade of the security grade memory 17 enables execution of the present application program, the CPU 11 executes the application program at step S14. If the security grade of the security grade memory 17 does not enable execution of the present application program, however, the CPU 11 outputs an error message at step S15. After steps S14 and S15, the CPU 11 terminates execution of the application program at S16.

Different security grades may be stored in security grade memory 17 in order to accommodate different levels of violence, vulgarity and lewdness of different application programs. The users may need to adjust or set different security grade. For example, the security grade needs to be changed when the user is changed from teenagers to adults.

A process of changing new security grade in the security grade memory 17 will now be described as follows. When the user inputs a specific key on booting the computer system, the security grade setup program stored to the ROM 14 is executed at step S21. And, the user inputs a secret number by a key input at step S22. The CPU 11 determines whether the secret number input by the user at step S22 corresponds to the secret number set to the security grade memory 17. If the secret number input by user at step S22 corresponds to the set secret number of the security grade memory 17, the user inputs a new security grade by the key input at step S24, and if not so, the CPU 11 outputs the error message at step S25. After steps S24 and S25, the setup program is terminated at step S26, and the CPU 11 executes a next routine.

As described above, the computer system according to the principles of the present invention has an internal memory for storing a security grade which is a program classification code set by a user for designating an unacceptable level of graphic sex, violence, or strong language contained in an application program. Accordingly, when an application program containing a security grade that exceeds the security grade stored in the internal memory is inserted into the computer system, no execution of that application program is permitted. As a result, the computer system constructed according to the principles of the present invention can effectively stop teenagers from executing application program that contains an unacceptable level of graphic sex, violence or strong language.

While there have been illustrated and described what are considered to be preferred embodiments of the present invention, it will be understood by those skilled in the art that various changes and modifications may be made, and equivalents may be substituted for elements thereof without departing from the true scope of the present invention. For example, if the computer system is further constructed to serve as a television receiver, then the application program can also encompass television programs that carry different program classification codes for different levels of graphic sex, violence and strong language. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:

a first memory device for storing an initialization program and a security grade setup program;

a second memory device for storing a security grade which is a program classification code selected by a user for designating an unacceptable program content contained in an application program, and a password for identifying the user when changing the security grade; and a controller for controlling execution of an application program according to the security grade of the application program and the security grade stored in said second memory device during operation of said initialization program, and for controlling the changing of the security grade stored in said second memory device during operation of said security grade setup program, when the user inputs a password that corresponds to the password stored in said second memory device.

2. The computer system of claim 1, further comprised of said first memory device corresponding to a read-only-memory.

3. The computer system of claim 1, further comprised of said second memory device corresponding to a non-volatile memory.

4. The computer system of claim 1, further comprised of said second memory device comprising:

an electrically erasable and programmable read-only-memory having an address port and a data port respectively connected to corresponding signal lines of a system bus, for executing data read/write operation under control of said controller; and an address decoder for reading address input through the address port of said electrically erasable and programmable read-only-memory, and determining whether an input address corresponds to said electrically erasable and programmable read-only-memory.

5. A method for controlling a computer system having a function of interrupting lewd/violent programs, said method comprising the steps of:

receiving an application program in the computer system;

comparing a security grade contained in an application program with a security grade set in the computer system when the application program is executed;

detennining whether the security grade set in the computer system enables execution of the application program;

executing the application program when the security grade set in the computer system enables execution of the application program; and alternatively, providing a visual display of an error message indicating that the application program cannot be executed, when the security grade set in the computer system does not enable execution of the application program.

6. The method of claim 5, further comprising:

receiving a password when an user inputs a specific key via a key input unit designating said password during initialization of the computer system;

determining whether the password input by the user corresponds to a set password; and updating a new security grade, via said key input unit, when the password input by the user corresponds to the set password; and alternatively, providing a visual display of an error message when the password input by the user does not correspond to the set password.

7. The method of claim 5, further comprised of the security grade set in the computer system enabling execution of the application program, when the security grade contained in the application program exceeds the security grade set in the computer system.

8. The method of claim 7, further comprising:

receiving a password when an user inputs a specific key via a key input unit designating said password during initialization of the computer system;

determining whether the password input by the user corresponds to a set password; and updating a new security grade, via said key input unit, when the password input by the user corresponds to the set password; and alternatively, providing a visual display of an error message when the password input by the user does not correspond to the set password.

9. A computer system, comprising:

a central processing unit;

a first memory for loading a program executed by the central processing unit;

a second memory for storing an initialization program and a security grade setup program;

a security grade memory device for storing a security grade which is a program classification code selected by a user for designating an unacceptable program content contained in an application program, and a password for identifying the user when changing the security grade;

a plurality of peripheral device controllers for driving operation of a plurality of peripheral devices including a display device, a keyboard, a printer, a hard disk drive and a compact-disk read-only-memory drive; and said central processing unit controlling execution of an application program according to the security grade of an application program and the security grade stored in said security grade memory device during initialization, and for controlling the changing of the security grade stored in said security grade memory device during said security grade setup, when the user inputs a password that corresponds to the password stored in said security grade memory device.

10. The computer system of claim 9, further comprised of said first memory corresponding to a random-access-memory.

11. The computer system of claim 9, further comprised of said second memory corresponding to a read-only-memory.

12. The computer system of claim 9, further comprised of said security grade memory device corresponding to a non-volatile memory.

13. The computer system of claim 9, further comprised of said security grade memory device comprising:

an electrically erasable and programmable read-only-memory having an address port and a data port respectively connected to corresponding signal lines of a system bus, for executing data read/write operation; and an address decoder for reading address input through the address port of said electrically erasable and programmable read-only-memory, and determining whether an input address corresponds to said electrically erasable and programmable read-only-memory.

* * * * *